(No Model.)
D. B. BENTLEY.
PRUNING SHEARS.
No. 406,620. Patented July 9, 1889.
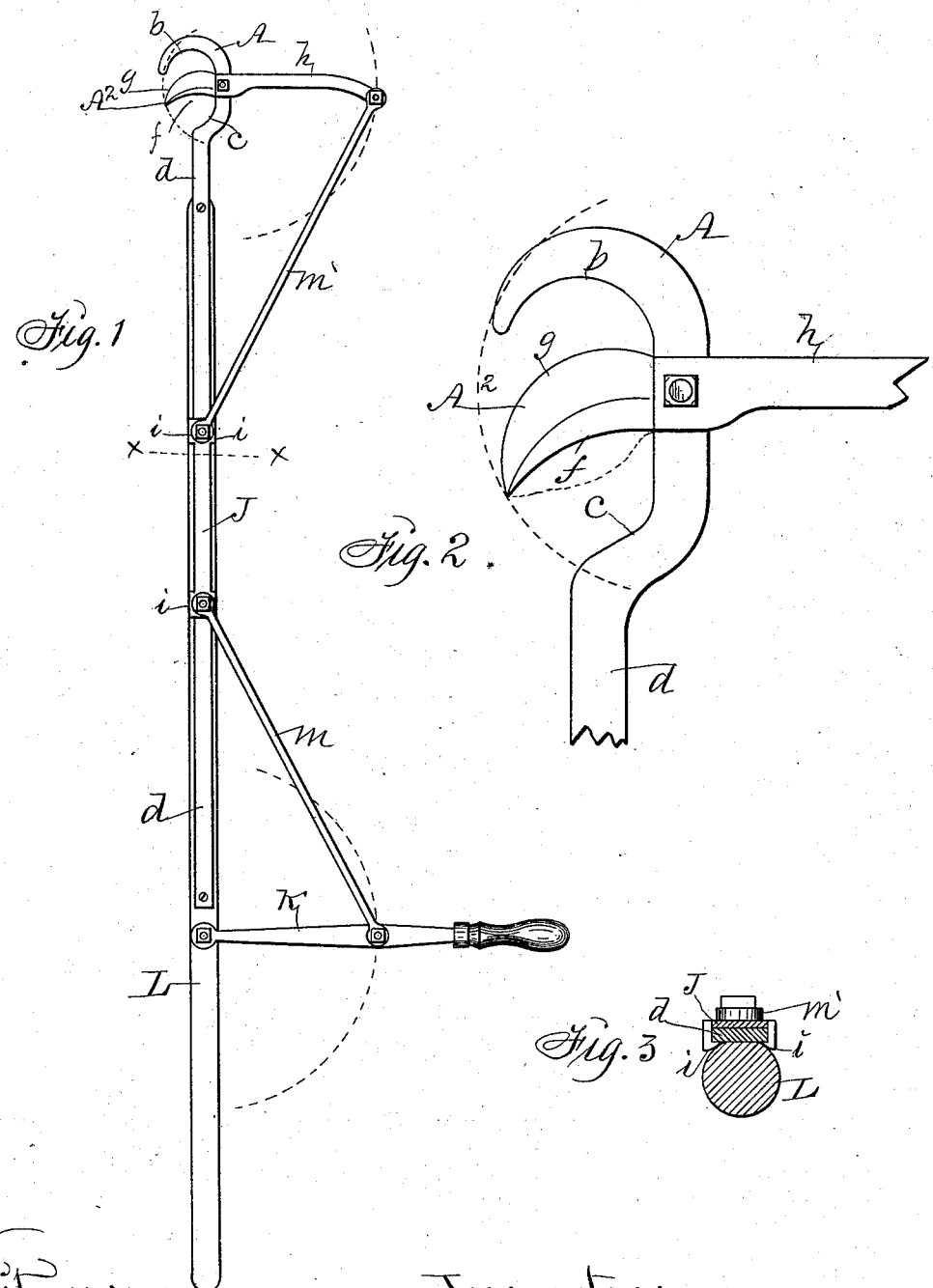

UNITED STATES PATENT OFFICE.

DANIEL B. BENTLEY, OF GENEVA, NEBRASKA, ASSIGNOR OF ONE-HALF TO DANIEL H. GOODRICH, OF SAME PLACE.

PRUNING-SHEARS.

SPECIFICATION forming part of Letters Patent No. 406,620, dated July 9, 1889.

Application filed February 25, 1889. Serial No. 301,017. (No model.)

*To all whom it may concern:*

Be it known that I, DANIEL B. BENTLEY, a citizen of the United States, residing at Geneva, in the county of Fillmore and State of Nebraska, have invented a Duplex Pruning-Shears, of which the following is a specification.

Heretofore a curved blade has been fixed to a handle and a blade having a convex cutting-edge conforming with the size and shape of the curved fixed blade pivoted to the fixed blade and handle in such a manner that the pivoted blade could be operated by means of a lever connected therewith to cut off a branch of a tree admitted between the two blades.

My invention consists in the construction of a blade that has two distinct curves and a blade that has a concave cutting-edge, and also a convex cutting-edge, and combining them with a handle, a lever, and a slide, as hereinafter set forth, in such a manner that a limb can be cut off at each upward motion of the lever, and also at each downward motion, and a tree pruned in less time and with less force and labor than with shears that cut only in one direction.

Figure 1 of the accompanying drawings is a side view of my complete implement. Fig. 2 is an enlarged view of the two cutting-blades pivoted together. Fig. 3 is an enlarged sectional view through the line $x\ x$ of Fig. 1.

A is the blade that has two distinct curves $b$ and $c$, and a straight shank or extension $d$, formed integral therewith or fixed thereto, and adapted to be fastened to a wooden handle by means of screws or rivets, as shown in Fig. 1.

$A^2$ is the blade that has a cutting-edge $f$ on its lower side and an edge $g$ on its upper side, and an integral extension $h$, that serves as a lever for operating it. It is pivoted to the blade A, about midway between the curves $b$ and $c$, by means of a screw-bolt, in such a manner that the friction between the two overlapping blades can be regulated by means of a nut on the end of the bolt.

J is a slide that has integral clasps $i$ at its ends that overlap the extension $d$, and fasten it thereto in such a manner that it can slide longitudinally.

$k$ is a hand-lever pivoted to the lower portion of the wooden handle L and connected with the lower end of the slide by means of a rod $m$.

$m'$ is a rod pivoted to the upper end of the slide and the end of the extension $h$ of the blade $A^2$.

In the practical use of my duplex shears I hook the curved blade A over a branch and then pull the hand-lever $k$ downward to cut off the branch. I next hang the blade $A^2$ on a branch and push the hand-lever $k$ upward to cut off the branch.

I claim as my invention—

The blade A, having curves $b$ and $c$, and an extension $d$, fixed to the handle L, the blade $A^2$, having cutting-edges $f$ and $g$, and an extension $h$, pivoted to the blade A, the slide J, having clasps $i$ at its ends, the lever $k$, pivoted to the lower end of the handle, and the rods $m$ and $m'$, connected with the ends of the slide, constructed and combined substantially as shown and described, for the purposes stated.

DANIEL B. BENTLEY.

Witnesses:
ALANSON CHAPMAN,
A. O. TAYLOR.